Jan. 27, 1942. W. R. SING 2,271,046
BUMPER GUARD OR BUMPERETTE
Filed Nov. 24, 1939
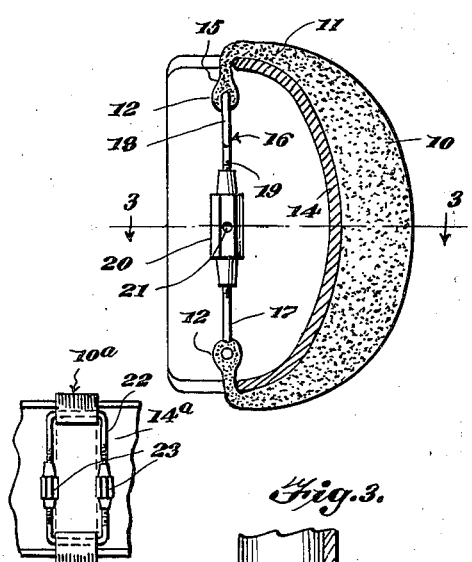
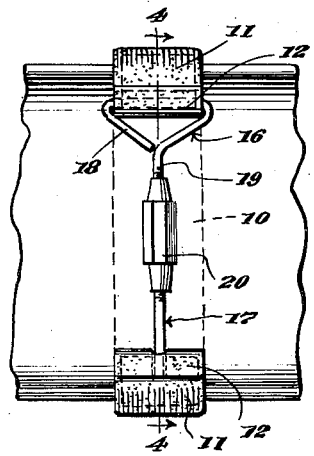
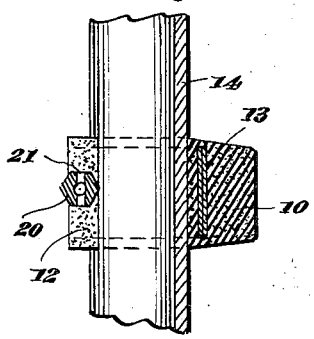
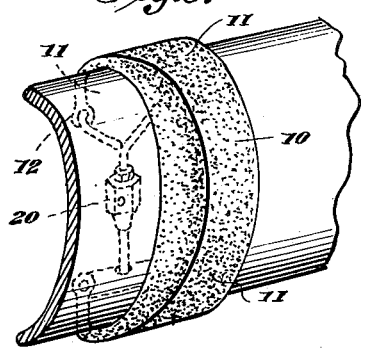
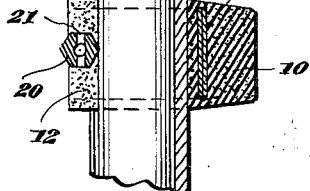
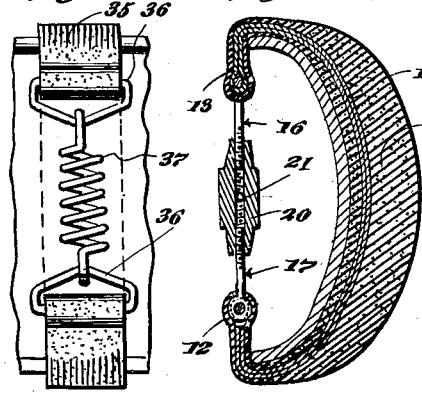
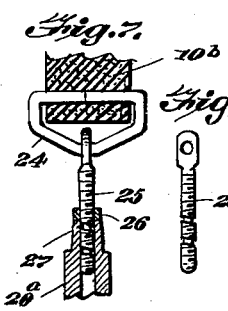
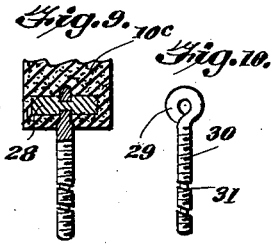
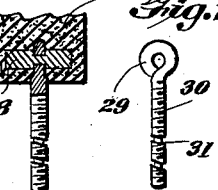
Inventor
WILLIAM R. SING
By Irving A. McCathran
Attorney Patented Jan. 27, 1942

2,271,046

UNITED STATES PATENT OFFICE 2,271,046

BUMPER GUARD OR BUMPERETTE

William R. Sing, Sacramento, Calif.

Application November 24, 1939, Serial No. 305,989

1 Claim. (Cl. 293—55)

This invention relates to resilient bumper guards and has for one of its objects the production of a simple and efficient bumper guard of a structure whereby one size will accommodate various width bumpers within certain limits, the guard being adjustable and it being possible to regulate the tension thereof to take up slack and prevent the guard from being accidentally dislodged from the supporting bumper.

A further object of this invention is the production of a simple and efficient bumper guard or bumperette which may be easily installed and moved to any desired position upon a bumper.

Other objects and advantages of the present invention will appear throughout the following specification and claim.

In the drawing:

Figure 1 is a side elevational view of the bumper guard, mounted upon a bumper, the bumper being shown in section;

Figure 2 is a rear elevational view of a portion of a bumper, showing the guard in position;

Figure 3 is a horizontal sectional view taken on line 3—3 of Figure 1;

Figure 4 is a vertical sectional view taken on line 4—4 of Figure 2;

Figure 5 is a perspective view of the guard showing the same attached to a portion of a bumper;

Figure 6 is a rear elevational view of the guard showing a modified form of fastening means, a fragmentary portion of a bumper being shown;

Figure 7 is a vertical fragmentary sectional view of a modified type of tension link;

Figure 8 is a side elevational view of the tension link shown in Figure 7;

Figure 9 is a vertical sectional view of a further modified type of means for connecting the tension link with the bumper guard;

Figure 10 is a side elevational view of the tension link shown in Figure 9;

Figure 11 is a rear elevational view of a modified tension means for connecting the ends of the bumper guard or bumperette.

By referring to the drawing, it will be seen that 10 designates the bumper guard or bumperette, the body portion of which is of a concavo-convex form, as shown in Figures 1, 4 and 5. The body portion of the guard tapers from the center to the end portions thereof, as indicated at 11. The terminals of the end portions 11 are provided with transverse journals 12. The body portion of the guard or bumperette is preferably formed of vulcanized rubber reinforced with fabric foundation strips 13 in a manner similar to the construction of the present conventional pneumatic tire casing. These strips 13, however, may be formed of resilient or flexible metal if desired, without departing from the spirit of the invention.

The body portion of the guard 10 is adapted to extend across the front face of the bumper 14 in the manner shown in Figures 1, 4 and 5, in a vertical position. The flexible neck portions 15 overhang the respective upper and lower edges of the bumper 14, as shown in Figures 1 and 4, the journals 12 extending toward each other.

Tension links 16 and 17 of suitable construction are mounted in the respective upper and lower journals 12, and these links may be of a variety of constructions. For the purpose of illustration, it will be noted that the tension link 16 comprises an eye 18 which extends through the upper journal 12, as shown, and it is provided with a depending threaded shank 19 which is threaded into a turnbuckle 20. The lower tension link 17 is journaled upon a transverse pin 21 mounted in the lower journal 12, and this tension link 17 comprises a shank which is also threaded and has threaded engagement with the lower end of the turnbuckle 20. A suitable aperture 21 is formed in the turnbuckle to receive a rod or pin to facilitate the rotation of the turnbuckle when drawing the journals 12 toward each other and drawing the bumper guard or bumperette tightly around in a snugly fitting position over the front face of the bumper 14, as shown.

In Figures 6 to 10 inclusive, I have shown various modified forms of the tension link mechanism which may be utilized in connection with the present invention. In particular it will be noted from the illustration shown in Figure 6 that the bumper guard 10$^a$ is engaged at its respective ends by a U-shaped tension link 22 the ends of which are engaged by turnbuckles 23 for holding the body portion of the guard 10$^a$ firmly upon the bumper 14$^a$. In the form shown in Figure 6, the U-shaped tension links are each provided with a pair of legs, the opposite legs of the respective links having threaded engagement with the turnbuckles 23.

From Figure 7 it will be noted that 10$^b$ indicates one end of the bumper guard which is provided with a link 24 and this link 24 is pivotally engaged by a threaded shank 25, the threaded shank 25 being in turn engaged by a suitable turnbuckle 20$^a$ similar to the turnbuckle 20. A suitable lock nut 26 may be employed for locking the turnbuckle in a set position if desired. The shank 25 may be provided with scored portions 27 at spaced intervals to facilitate shortening of the shank 25 if desired, merely by breaking off the extended end of the shank, as will be obvious.

In Figure 9 it will be noted that one end of the bumper guard is indicated by the numeral 10° which carries a transverse pin 28 over which fits the expansible eye 29 of the threaded shank 30, which shank may also be scored, as indicated at 31, to facilitate shortening of the shank when desired, the shank being adapted to engage the turnbuckle similar to that previously described. It should be understood that the forms shown in Figures 6 to 10 previously referred to, merely indicate alternative constructions for connecting the turnbuckle or tightening means to the ends of the bumper guard or bumperette.

From the foregoing description it will be seen that a very simple and attractive as well as efficient and neat appearing device has been provided in the nature of the bumper guard or bumperette which will be inexpensive to manufacture and which will require a minimum amount of material. Furthermore, it should be understood that the rubber face may be readily molded to different patterns without departing from the spirit of the invention, and that the device may be easily installed by anyone even though he may be inexperienced in the manipulation of mechanical devices. Furthermore, the bumper guard may be easily moved to any position within the length of the bumper without the use of special tools and may be easily tightened to increase the tension across the face of the bumper and over the edges thereof to take up slack and in this way prevent the device from becoming accidentally dislodged. Furthermore, one size of the bumper guard will accommodate various widths of bumpers within certain limits, in view of the flexible neck structure indicated by the numeral 15, and the adjustable turnbuckle assembly in conjunction with the tension links 16 and 17, such as is shown in Figure 1. This will eliminate the necessity of manufacturing excessive numbers of various sizes of bumper guards. The flexibility of the body will of course allow the device to follow any contour. Because of the fact that the body is formed of rubber or other similar flexible and resilient material the device will reduce scuffing of highly polished and plated surfaces to a minimum. The bumper guard may be placed at any unprotected point on the bumper, and cannot be easily dislodged in view of the fact that the adjustment of the turnbuckle will cause a proper tension to hold the bumper guard or bumperette taut against the surface of the bumper.

As shown in Figure 11, I have illustrated a modified type of tension means for the bumperette wherein the bumperette 35 has its flexible ends connected to links 36, which links are in turn connected by a tension coil spring 37, in this way drawing the ends of the bumper or bumperette 35 toward each other and holding the bumperette at a tension around the front face of the bumper in a manner similar to that shown in Figure 1.

It should be understood that certain detail changes in the mechanical construction may be employed without departing from the spirit of the invention so long as such changes fall within the scope of the appended claim.

Having described the invention, what is claimed is:

A bumper guard of the class described formed of resilient material and adapted to extend transversely across the face of a bumper, the guard having flexible end portions adapted to overhang the respective upper and lower edges of the bumper, tension means for drawing the flexible end portions together to tightly hold the bumper guard upon a bumper, the flexible end portions having transverse journals for receiving the tension means; said tension means comprising oppositely arranged threaded shank portions journaled within the journals, and a turnbuckle engaging the shank portions for drawing the same together, the shank portions being scored transversely adjacent their ends to provide portions to be broken off to decrease the length thereof without interfereing with the threaded portions.

WILLIAM R. SING.